March 24, 1970 — R. R. MAXA — 3,502,368
COLLAPSIBLE OVERHEAD GUARD STRUCTURE FOR LIFT TRUCKS
Filed July 18, 1968
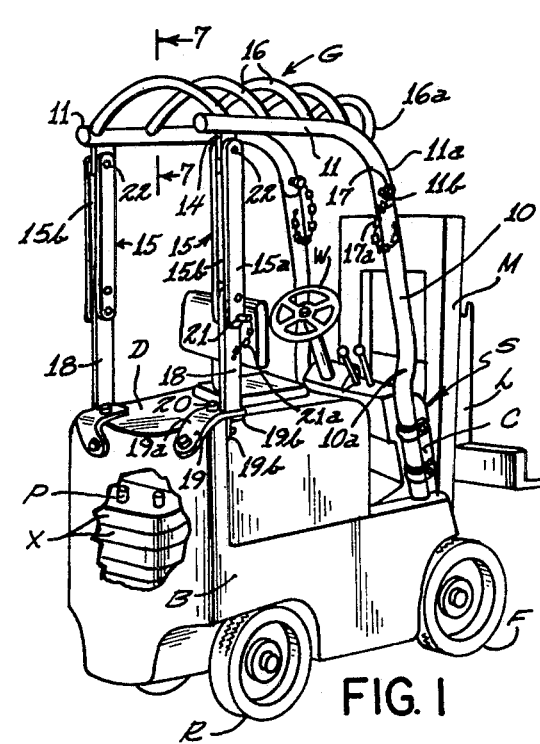
FIG. 1
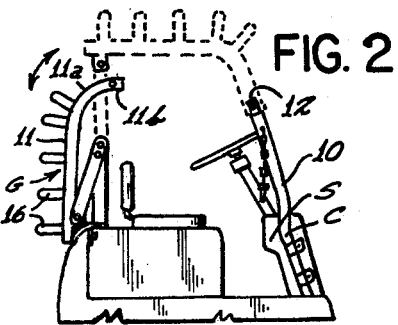
FIG. 2
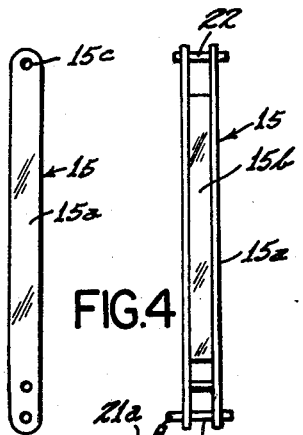
FIG. 3   FIG. 4
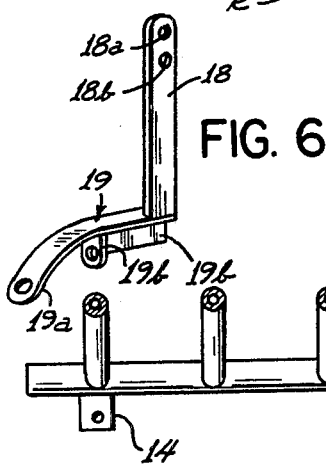
FIG. 6
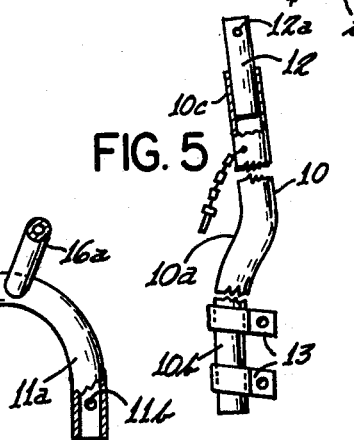
FIG. 5
FIG. 7
INVENTOR.
RAYMOND R. MAXA
BY
Williamson, Palmatier & Bains
ATTORNEYS United States Patent Office 3,502,368
Patented Mar. 24, 1970

3,502,368
COLLAPSIBLE OVERHEAD GUARD STRUCTURE
FOR LIFT TRUCKS
Raymond R. Maxa, Lakeville, Minn., assignor to
Material Handling Engineers, Inc., Minneapolis,
Minn., a corporation of Minnesota
Filed July 18, 1968, Ser. No. 745,795
Int. Cl. B62d 25/06
U.S. Cl. 296—102                                    2 Claims

ABSTRACT OF THE DISCLOSURE

A collapsible overhead guard for lift trucks of the type having a compact, self-propelled body and which, when attached to a lift truck, makes provision for a rugged overhead, generally horizontal guard disposed a few feet above the level of the head of the driver, but which, while still attached to the truck, may be collapsed including the redisposal of all parts of the guard structure in compact, non-protruding position relative to the lift truck and the driver. The generally horizontal guard is rigidly supported in operative position from a set of upstanding forward posts and a set of upstanding rearward posts. One set of these posts is made of a collapsible nature and actually has fixed attachment to the guard so that, when collapsed, the guard is disposed with no parts protruding from the general configuration or peripheral confines of the truck. When so collapsed, the other set of supporting means is so shortened that the truck, with the collapsed device thereon, may readily go through all manipulations in low-ceiling structures such as semi-trailers, storage bins and rooms.

This invention relates to safety devices for powered fork lift trucks and particularly to a readily attachable overhead guard adapted to be collapsed in minimal space without protrusion of parts from the peripheral confines of the truck to facilitate entrance and operation of the truck in the interior of semi-trailers or other compartments or storage bins having relatively low ceilings.

Fork lift trucks, such as those made by Clark Equipment Company of Buchanan and Battle Creek, Mich., are very extensively used for moving, handling and stacking goods and containers of practically all types in warehouses, lumberyards and other storage facilities. They are usually constructed of short wheel base and other dimensions with provisions for sharp turning and minimum volumetric space requirements so that they may operate in narrow aisles or access space and furthermore so that they may operate and unload from relatively low ceiling transport carriers, such as semi-trailers, trucks and the like. Any safety attachments for such lift trucks which add projection to the rear or forward ends or to the sides of such trucks are generally undesirable since they reduce maneuverability of the lift truck under many of the essential working conditions thereof.

It is an object of my invention to provide an overhead guard for the driver and operator of a conventional type lift truck which will prevent injury to the operator from falling of objects or the toppling of containers or goods from above; which may be readily attached to a number of conventional lift trucks now in use; which may be very quickly converted to a collapsed or semi-collapsed position without protrusion of any of the parts thereof from the sides or ends of the truck or vehicle, thus enabling the lift truck to successfully operate for unloading from a low ceiling carrier, such as a semi-trailer, truck or low storage bin.

A further object is the provision of an overhead operator's guard of the type described which will be of rugged nature, which will withstand hard and prolonged use and which, whether in the operative guarding position or in collapsed position, will further act as a load-backrest for the lift and load imposed thereon.

The foregoing, and other objects of the invention, will be more fully apparent from the following description made in connection with the accompanying drawings wherein:

FIG. 1 is a rear side perspective view of a conventional fork lift truck having an embodiment of my invention operatively attached thereto for guarding the operator;

FIG. 2 is a side elevation of the upper portion of the lift truck with my guard structure disposed in the compacted collapsed position to enable the truck to operate in low-ceiling carriers, such as semi-trailers and low bins;

FIG. 3 is a side elevation of one of the outermost rear supporting post-links;

FIG. 4 is a rear elevation of the same;

FIG. 5 is a detailed side elevation with an upper portion broken away showing one of the pair of forward supporting posts of my structure;

FIG. 6 is a detailed perspective view of a suitable supporting bracket employed for rugged connection of the lowermost toggle, rear supporting links with the rear and counterweighted portion of the lift truck; and FIG. 7 is a vertical section taken along the lines 7—7 of FIG. 1 showing an embodiment of the overhead guard proper with a portion of the forward end broken away.

In the embodiment of my invention shown, the overhead guard and load-backrest is applied to a conventional type of powered lift truck having a generally rectangular body or housing B, powered in conventional manner for propulsion in forward and rearward directions and supported on rear wheels R and forward wheels F. The said conventional lift trucks are usually provided with high-capacity battery source of electrical power for furnishing motor-equipped propulsion, as well as the hydraulic pump means for operating the lift. In such conventional lift trucks, the rear wheels R are usually swiveled for sharp turning of the vehicle and a multi-sectional double-mast structure M is provided at the forward end (not shown in detail) for telescopic projections to a variety of heights and upon which the vertical reinforced frame of the lift proper L is slidably mounted for hydraulic raising and lowering, having at its lower end the transversely extending lift fingers L–1. The double-mast structure conventionally may be swung or tilted slightly rearwardly and forwardly of the vertical position shown in FIG. 1 of the drawings.

At the forward end of the truck vehicle starting above the floor line there is a rigid upstanding metal structure, indicated as an entirety by S, which serves as a mounting for the controls and the steering wheel W and which at its forward upstanding surface constitutes a load rest for the double telescoping mast portions M and the loaded lift L when the mast is inclined slightly rearwardly. This structure at its side portions, in the form of lift truck disclosed, is provided with inclined flat shoulders C which with attachment means, may be conveniently used for support of my upstanding tubular forward guard-supporting posts 10.

Within the medial and rear portion of the general enclosure defined by body B is conventionally mounted one or more large storage batteries, not shown, and at the rear portion of said enclosure counterweight elements X which, as shown, are removably impaled upon upstanding pins P.

Forward supporting means for my novel guard structure comprises a pair of strong rigid forward posts 10 preferably constructed from suitable tubular metal, having ts lower medial portions bent slightly on reverse curves at 10a to provide straight lower portions 10b which will closely fit the respective shoulders C at the sides of the forward upstanding supporting structure S. The upward portions of the post 10 from the reversely curved medial portions 10a extend upwardly and are inclined rearwardly somewhat from the vertical, forming at their upper ends 10c supports and connections for the depending curved side members of the guard proper, which is indicated as an entirety by the letter G.

To assure efficient and rugged telescopic attachment of the forward curved ends of the side guard members 11, the upper extremities of post 10 have telescoped and preferably welded therein upstanding stub shafts 12 of substantially the inner interior diameter of the upper ends 10c which, near their upper extremities, are drilled to form pin-receiving diametrically disposed apertures 12a. The lower portion 10b of each of the forward posts 10 is provided, as shown, with a pair of spaced welded, or otherwise rigidly attached, bolt-receiving tongues 13 which serve to positively affix the lower ends of the posts to suitable tap sockets, not shown, formed in the portions of the general supporting structure S immediately adjacent to the shoulder C.

The guard proper, in the form illustrated, comprises the tubular side rails 11 having the curved depending forward portions 11a and disposed in parallel relation throughout the main portions thereof and provided adjacent the rear ends of members 11 with depending welded attachment blocks 14 which are pivotally connected, as will later appear, with heavy outward links, indicated as entireties by the number 15, of a collapsing and supporting toggle structure. The main portions of the two guard rails 11 are rigidly interconnected by a plurality of convexly curved transverse guard tubes 16 which may be firmly welded at their appropriately cut extremities to the respective tubular rails 11. The forwardmost of the guard tubes, indicated at 16a when my structure is disposed in operative position as will be seen from FIGS. 1 and 7, projects forwardly somewhat of a vertical line passing through the forward side of the general supporting structure S. The forward lower ends of the guard rails 11a, in straight terminal tubular portions, are adapted to telescope over the upstanding extremities of the stub shafts 12 carried by post 10 and are each provided with a diametric pin-receiving aperture 11b for reception of a locking pin 17 which, as shown, is flexibly supported by a chain 17a from the upper portion of the associated post 10.

The rear of the guard device G is rigidly but collapsibly supported by the upstanding toggle link structures 15, each of which comprises a rugged upstanding rigid bar 18, abutment-welded as shown to medial portion of an attachment bracket 19, said bracket as shown having a downwardly curved rear end 19a and carrying a vertical reinforcing web or flange 19b which is adapted to abut against a side wall provided by the general frame and housing structure B of the vehicle disposed above that portion of the housing which maintains the heavy storage batteries as well as the counterweights X. The bracket 19 as shown also has an intermediate depending attachment tab 19c, said tab and other portions being rigidly connected with appropriate portions of the frame and housing for the body B by such means as bolts 20. The rigid supporting bars 18 extend upwardly a distance approximately half of the full height of the guard element G when operatively disposed above the deck D of the housing body.

At the upper portion of the two rigid upstanding supporting posts 18 a pivot bore 18a is formed for receiving a pivot pin to connect the post with the upstanding linkage structure 15, and a second bore 18b is formed to receive a rigid-interlock pin 21 which, as shown, is conveniently flexibly connected by a chain 21a with the intermediate portion of post 18.

Each of the linkage structures 15, which constitute a part of collapsing toggle mechanisms in the form of the invention illustrated, comprise a pair of elongated rigid side bars 15a spaced apart and welded or otherwise rigidly secured to a spacer bar 15b which, in length, is short of both ends of the bars 15a to provide accommodation for pivoting and swinging of related parts. The upper ends of the two outside bars 15 are apertured to receive a pivot bolt 22 which passes through the associated depending cap 14 at the rear of one of the sides of the guide element G.

In FIG. 1 my improved guard structure is shown in its elevated operative position with the top extremities of the forward posts 10 (more specifically the stub shafts 12) being telescoped into the depending extremities of the forward portions 11a of the guard rails. The telescoped parts are locked together by the locking pins 17 which, as shown, are flexibly connected by chains 17a to the upper portions of posts 10. The two rear supporting toggle structures are extended or swung into rigid upright position interlocked as to the outer links 15 and the upstanding bars 18 by overlapping of the inner ends of plates 15a and pin connection by lock pins 21 through the apertures formed near the top of bars 18 and in the innermost portions of the plates 15b.

The structure so constituted is of very rugged and durable form and it will be noted that the heavy guard tubes 16 are curved to substantially conform, as shown in FIG. 2, when the structure is collapsed to the rear peripheral shape of the lift truck body. The overhead space above the driver's seat of the truck and including space above the steering wheel W is protected from falling objects, cartons or other objects which could otherwise injure the operator in the use of the truck.

In FIG. 2 my structure is shown in the collapsed position where the pins 17 have been removed from interlocking relation with the forward depending portions of the grill and thereafter the grill or guard structure proper G has been swung into a substantially collapsed relation with the outermost linkage medias 15 of the rear supports. Likewise, the links 15 with the grill in collapsed position have been swung rearwardly and downwardly into compact relation with the upstanding short posts 18. It will be noted that in such collapsed relation the rear portions of the rails 11 of the guard abut against the rear upper portion of the truck body and usually against the curved bracket ends 19, thus preventing the guard member proper from swinging rearwardly past the collapsed position shown in FIG. 2.

With my structure the entire guard mechanism, when collapsed, is disposed substantially within the peripheral confines of the body of the lift truck and the then highest point of the guard structure is rearwardly and at about the height of the driver's head. In this collapsed position the truck may be operated and manipulated in low-ceiling semi-trailers, bins and rooms having ceilings as low as six feet above floor level.

With my improved construction the guard structure, once applied to the truck, may be permanently carried thereby since it in no way encumbers the various functions and operations of the lift truck. When the guard structure is collapsed, as shown in FIG. 2, it does not in any way impede or restrict the maneuverability and turning of the lift truck in narrow aisles or confined spaces.

It will, of course, be understood that various changes may be made in the form, details and parts, all within the scope of my invention disclosed herein and as defined in the appended claims.

What is claimed is:

1. A collapsible overhead guard for lift trucks of the type having a compact, self-propelled body, and a forwardly disposed upstanding lift mast, said guard having in combination:

forward and rearward upstanding supporting means affixed at their lower ends with forward and rearward portions respectively of the lift truck, said forward supporting means comprising a pair of upstanding rigid fixed posts terminating near the level of the top of said lift mast, said rear supporting means comprising a pair of relatively short rigid posts and for each short post a collapsible rigid member connected with the upper end of its short post, means for rigidly interlocking said collapsible means with said short posts in extended relation, a generally horizontally disposed rigid and non-collapsible guard grill supported in operation from said upstanding means, said guard grill having rigid side members depending at their forward ends for releasible connection with the upper ends of said fixed forward posts, said guard grill being swingable rearwardly and downwardly to an upright position at the rear of the lift truck body, said rigid members collapsibly connected with said posts having at their outer ends pivotal connections with the side members of said guard grill, said connections being disposed substantially rearwardly of the medial portions of said grill.

2. The structure set forth in claim 6 further characterized by said collapsible rigid members comprising arm-links pivotally connected at their inner ends with the upper portions of said short posts.

References Cited

UNITED STATES PATENTS

| 1,236,207 | 8/1917 | Oliver | 296—108 |
| 2,423,748 | 7/1947 | Acheson | 296—102 |

FOREIGN PATENTS 1,265,317  5/1961  France.

LEO FRIAGLIA, Primary Examiner

ROBERT R. SONG, Assistant Examiner

U.S. Cl. X.R.

280—150